US010251336B1

(12) United States Patent
Ksiksi et al.

(10) Patent No.: US 10,251,336 B1
(45) Date of Patent: Apr. 9, 2019

(54) DRIP IRRIGATION SYSTEM

(71) Applicant: UNITED ARAB EMIRATES UNIVERSITY, Al Ain (AE)

(72) Inventors: Taoufik Ksiksi, Al Ain (AE); Shaijal Babu Thru Ppoyil, Al Ain (AE); Abdulla Yousif Abdulla M. Almarzooqi, Al Ain (AE); Soltan Abdollah Barahim, Al Ain (AE)

(73) Assignee: United Arab Emirates University, Al-Ain (AE)

( * ) Notice: Subject to any disclaimer, the term of this patent is extended or adjusted under 35 U.S.C. 154(b) by 0 days.

(21) Appl. No.: 16/025,980

(22) Filed: Jul. 2, 2018

(51) Int. Cl.
*A01G 25/06* (2006.01)
*A01G 25/02* (2006.01)
*A01C 23/04* (2006.01)

(52) U.S. Cl.
CPC ............ *A01C 23/042* (2013.01); *A01G 25/02* (2013.01); *A01G 25/06* (2013.01)

(58) Field of Classification Search
CPC ...... A01G 25/02; A01G 25/023; A01G 25/06; A01G 30/00; A01G 30/02; A01G 2025/006; A01G 31/00; A01G 31/02; B05B 1/02; B05B 1/20–1/207; B05B 7/00; B05B 7/0433; F16L 11/22; F16L 55/07; A01C 23/042
USPC ....... 239/398, 423, 427, 429–431, 542, 547, 239/566, 416.4, 416.5, 549; 138/92, 111, 138/116
See application file for complete search history.

(56) References Cited

U.S. PATENT DOCUMENTS

| 2,127,175 A | 8/1938 | Imbertson et al. |
| 2,789,867 A * | 4/1957 | Bloom ..................... B05B 7/04 239/431 |
| 2,909,002 A | 10/1959 | Hendry |
| 4,133,671 A | 1/1979 | Mikel |
| 4,365,757 A | 12/1982 | Alajos et al. |

(Continued)

FOREIGN PATENT DOCUMENTS

| CN | 102138448 A | 8/2011 |
| CN | 204393017 U | 6/2015 |

(Continued)

OTHER PUBLICATIONS

Enoch et al., "Plant response to irrigation with water enriched with carbon dioxide," New Phytol., 1993, 125, 249-258.

*Primary Examiner* — Jason J Boeckmann
*Assistant Examiner* — Cody J Lieuwen
(74) *Attorney, Agent, or Firm* — Richard C. Litman

(57) ABSTRACT

The drip irrigation system allows for the irrigation of soil with carbon dioxide-infused water. The drip irrigation system includes a pipe having first and second inlets. The first inlet is adapted for receiving pressurized carbon dioxide gas, and the second inlet is adapted for receiving water under pressure. A plurality of drip nozzles are mounted to the pipe, such that each drip nozzle is in fluid communication with an interior of the pipe. An inner tube is mounted in the interior of the pipe and is in fluid communication with the first inlet for receiving the pressurized carbon dioxide gas. The pressurized carbon dioxide is expelled through a plurality of ports of the inner tube to mix with the water flowing within the interior of the pipe. This mixture forms water infused with carbon dioxide, which is then released, in the forms of drops, by the plurality of drip nozzles.

7 Claims, 2 Drawing Sheets

(56) References Cited

U.S. PATENT DOCUMENTS

| | | | |
|---|---|---|---|
| 4,878,614 A | 11/1989 | Hach et al. | |
| 6,010,077 A | 1/2000 | Casey | |
| 6,237,284 B1 | 5/2001 | Erickson | |
| 7,487,927 B2 | 2/2009 | Lewis | |
| 2002/0183935 A1* | 12/2002 | Skinner | A01G 17/02 702/19 |
| 2007/0252023 A1* | 11/2007 | Walter | A01G 25/06 239/734 |
| 2008/0191052 A1* | 8/2008 | Malamutmann | B05B 7/0416 239/9 |
| 2008/0219769 A1 | 9/2008 | Ding et al. | |
| 2009/0052990 A1* | 2/2009 | Richardson | A01G 25/06 405/43 |
| 2009/0187484 A1* | 7/2009 | Arbogast | A01N 59/04 705/14.36 |
| 2010/0275512 A1 | 11/2010 | Nien | |
| 2018/0000024 A1* | 1/2018 | Erickson | A01G 7/02 |
| 2018/0105475 A1* | 4/2018 | Keating | C05C 5/04 |

FOREIGN PATENT DOCUMENTS

| | | | |
|---|---|---|---|
| GB | 1202921 A | 8/1970 | |
| JP | 04222624 A | 8/1992 | |

\* cited by examiner

DRIP IRRIGATION SYSTEM

BACKGROUND

1. Field

The disclosure of the present patent application relates to soil irrigation, and particularly to a drip irrigation system which releases water infused with carbon dioxide.

2. Description of the Related Art

Drip irrigation is a type of micro-irrigation with the potential to save water and nutrients by allowing water to drip slowly to the roots of plants, either from above or below the soil surface. The goal of drip irrigation is to place water directly into the root zone and minimize evaporation. Drip irrigation systems distribute water through a network of valves, pipes, tubing and emitters. Due to the network of conduits and other components involved in drip irrigation, maintaining adequate pressure in drip irrigation systems can be difficult. Inadequate or uneven pressure throughout the system can result in poor and/or uneven water distribution to the soil.

Further, most drip irrigation systems only supply water to the soil. Any additional additives, such as fertilizers, are typically added separately. It would be desirable to be able to simultaneously irrigate and fertilize the soil. Thus, a drip irrigation system solving the aforementioned problems is desired.

SUMMARY

The drip irrigation system allows for the irrigation of agricultural soil with carbon dioxide-infused water. The drip irrigation system includes a pipe having first and second inlets. The first inlet is adapted for receiving pressurized carbon dioxide gas from an external source of pressurized carbon dioxide, such as a pressurized tank or the like, and the second inlet is adapted for receiving water under pressure from an external source, such as a municipal water supply or the like. A plurality of drip nozzles are mounted to the pipe, such that each drip nozzle is in fluid communication with an interior of the pipe.

An inner tube is mounted in the interior of the pipe and is in fluid communication with the first inlet for receiving the pressurized carbon dioxide gas. The pressurized carbon dioxide is expelled through a plurality of ports of the inner tube to mix with the water under pressure flowing within the interior of the pipe. This mixture forms water infused with carbon dioxide, which is then released, in the forms of drops, by the plurality of drip nozzles. The inner tube may be mounted to an inner wall of the pipe, diametrically opposed to the plurality of nozzles. With this arrangement, the plurality of ports of the inner tube may be aligned with the plurality of drip nozzles. This allows the water infused with carbon dioxide to receive pressurized assistance in exiting through the drip nozzles due to the pressurized carbon dioxide gas being released through the ports. Thus, the carbon dioxide not only acts as a fertilizer for the plants, but also increases pressure in the system, minimizes water use and provides for more uniform liquid distribution.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
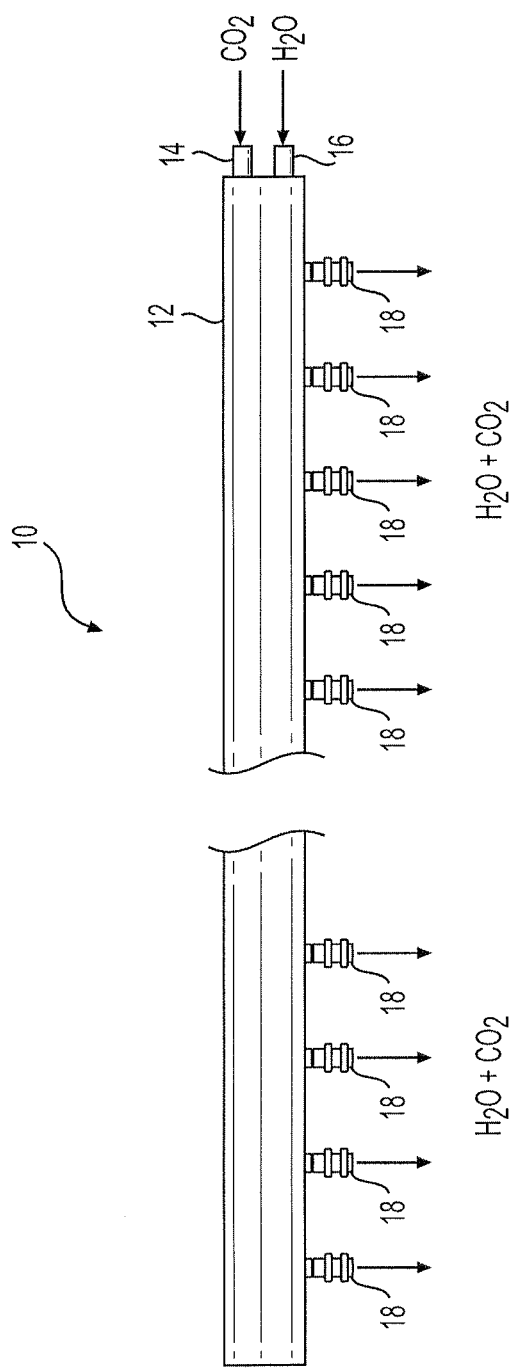
FIG. 1 diagrammatically illustrates a drip irrigation system.

As shown in FIG. 1, the drip irrigation system 10 includes a pipe 12 having first and second inlets 14, 16, respectively. The first inlet 14 is adapted for receiving pressurized carbon dioxide gas ($CO_2$) from an external source of pressurized carbon dioxide, such as a pressurized tank or the like, and the second inlet 16 is adapted for receiving water ($H_2O$) under pressure from an external source, such as a municipal water supply or the like. It should be understood that the first and second inlets 14, 16, respectively, may include any suitable type of adapter, connector or the like, dependent upon the respective sources of carbon dioxide and water. Pipe 12 may be similar to the water distribution pipe used in conventional drip irrigation systems, although it should be understood that pipe 12 may have any desired relative dimensions, dependent upon the particular agricultural requirements of drip irrigation system 10. As a non-limiting example, pipe 12 may be a polyvinyl chloride (PVC) pipe having a diameter ranging from approximately 15 mm to approximately 20 mm.

Figure 2:
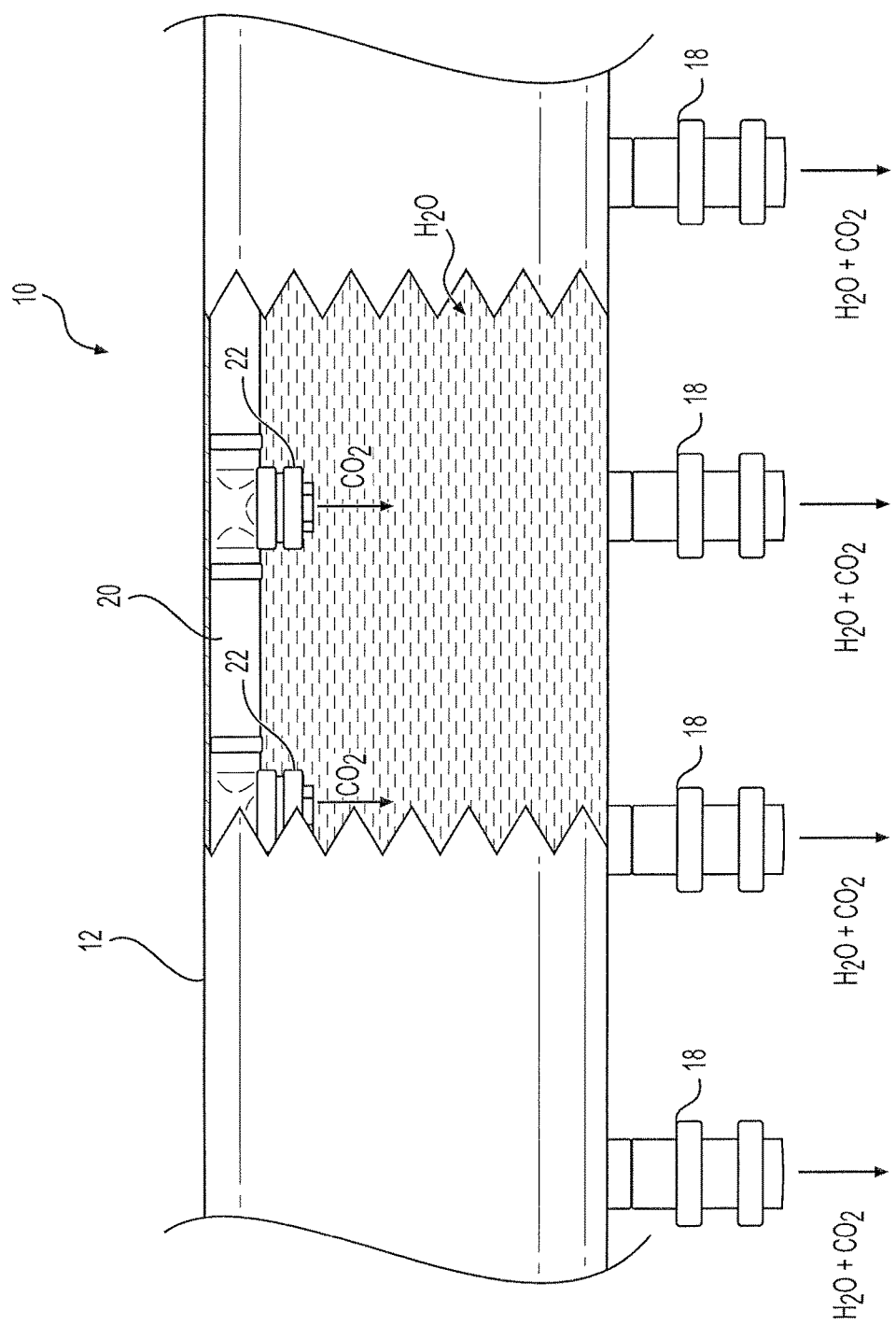
FIG. 2 is a partially cut away, partial side view of the drip irrigation system

A plurality of drip nozzles 18 extend from the pipe 12, such that each drip nozzle 18 is in fluid communication with an interior of the pipe 12. It should be understood that any suitable type of drip nozzle may be utilized, as are well known in the field of drip irrigation, such as a conventional emitter nozzle, emitter hole or the like. As shown in FIG. 2, an inner tube 20 is mounted in the interior of the pipe 12 and is in fluid communication with the first inlet 14 for receiving the pressurized carbon dioxide gas. The pressurized carbon dioxide is expelled through a plurality of ports 22 of the inner tube 20 to mix with the water under pressure flowing within the interior of pipe 12. It should be understood that ports 22 may include any suitable type of nozzles, infusers or the like for expelling the pressurized carbon dioxide into the water within pipe 12. It should be further understood that inner tube 20 may have any desired relative dimensions, dependent upon the particular agricultural requirements of drip irrigation system 10. Corresponding to the non-limiting example described above, inner tube 20 may have an inner diameter ranging from approximately 4 mm to approximately 5 mm. Additionally, it should be understood that the spacing of drip nozzles 18 is also dependent upon the particular agricultural requirements of drip irrigation system 10. For example, the ports or nozzles may be spaced at intervals of 20 cm, 40 cm or 60 cm, for example, dependent upon the particular needs of the user.

The mixing of the carbon dioxide from ports 22 into the water contained within pipe 12 forms water infused with carbon dioxide, which is then released, in the forms of drops, by the plurality of drip nozzles 18. The carbon dioxide can serve as a fertilizer for the plants. As shown in FIG. 2, the inner tube 20 may be mounted to an inner wall of the pipe, diametrically opposed to the plurality of nozzles 18. With this arrangement, the plurality of ports 22 of the inner tube 20 may be aligned with the plurality of drip nozzles 18. This allows the water infused with carbon dioxide to receive pressurized assistance in exiting through drip nozzles 18 due to the pressurized carbon dioxide gas being released through ports 22. The pressurized release of the carbon dioxide from ports 22 increases pressure in the system, thereby, minimizing water use and providing for more uniform liquid distribution.

It is to be understood that the drip irrigation system is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A drip irrigation system, comprising:
   a source of pressurized carbon dioxide gas and a source of water under pressure;
   a hollow pipe having first and second inlets, an inner surface and an outer surface, the first inlet being in fluid communication with the pressurized carbon dioxide gas, the second inlet being in fluid communication with the water under pressure;
   a plurality of drip openings disposed only along a single portion of the outer surface of the pipe, wherein each opening is in fluid communication with an interior of the pipe; and
   an inner tube, the inner tube having an outer surface, the inner tube being mounted to the inner surface of the pipe along a first portion of the outer surface of the inner tube, the inner tube having a plurality of openings formed solely along a second portion of the outer surface of the inner tube, wherein the inner tube is in fluid communication with the first inlet for receiving the pressurized carbon dioxide gas and expelling the pressurized carbon dioxide through the plurality of openings into the pipe and the water disposed therein, wherein the plurality of inner tube openings are aligned with a corresponding drip opening along the outer surface of the pipe.

2. The drip irrigation system as recited in claim 1, wherein the inner tube is mounted to an inner wall of the pipe.

3. The drip irrigation system as recited in claim 1, wherein the hollow pipe has a diameter ranging from 15 mm to 20 mm.

4. The drip irrigation system as recited in claim 3, wherein the hollow pipe is made from polyvinyl chloride (PVC).

5. The drip irrigation system as recited in claim 3, wherein the inner tube has an inner diameter ranging from 4 mm to 5 mm.

6. The drip irrigation system as recited in claim 1, wherein each of the inner tube openings has a nozzle mounted therein.

7. The drip irrigation system as recited in claim 1, wherein each of the pipe openings has a drip nozzle mounted therein.

* * * * *